US008448240B2

(12) United States Patent
Hammoutene et al.

(10) Patent No.: US 8,448,240 B2
(45) Date of Patent: May 21, 2013

(54) ROLE-BASED ACCESS CONTROL

(75) Inventors: Malik Hammoutene, Martigny (CH);
Milan Petkovic, Eindhoven (NL);
Claudine Viegas Conrado, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 567 days.

(21) Appl. No.: 12/162,844

(22) PCT Filed: Jan. 30, 2007

(86) PCT No.: PCT/IB2007/050313
§ 371 (c)(1),
(2), (4) Date: Jul. 31, 2008

(87) PCT Pub. No.: WO2007/088510
PCT Pub. Date: Aug. 9, 2007

(65) Prior Publication Data
US 2009/0019516 A1    Jan. 15, 2009

Related U.S. Application Data

(60) Provisional application No. 60/763,879, filed on Jan. 31, 2006.

(51) Int. Cl.
*G06F 12/00* (2006.01)
(52) U.S. Cl.
USPC .......... 726/21; 726/1; 726/26; 713/201; 713/151; 713/187; 713/191; 713/193; 705/7; 705/22; 705/51

(58) Field of Classification Search ..... 370/350; 705/51; 380/255–258; 713/201, 151–156, 161, 168–170, 713/187, 191, 193; 709/220–224; 726/26
See application file for complete search history.

(56) References Cited

U.S. PATENT DOCUMENTS

| | | | |
|---|---|---|---|
| 5,991,877 A * | 11/1999 | Luckenbaugh | 726/1 |
| 6,023,765 A | 2/2000 | Kuhn | |
| 6,073,242 A * | 6/2000 | Hardy et al. | 726/1 |
| 6,430,561 B1 * | 8/2002 | Austel et al. | 1/1 |
| 6,529,877 B1 * | 3/2003 | Murphy et al. | 705/7.22 |
| 6,618,697 B1 * | 9/2003 | Kantrowitz et al. | 703/22 |
| 6,947,989 B2 | 9/2005 | Gullotta | |
| 7,290,147 B2 * | 10/2007 | Bittner et al. | 713/187 |
| 2002/0002577 A1 | 1/2002 | Garg | |
| 2002/0010679 A1 * | 1/2002 | Felsher | 705/51 |
| 2002/0178119 A1 | 11/2002 | Griffin | |
| 2003/0140044 A1 * | 7/2003 | Mok et al. | 707/10 |
| 2003/0154208 A1 * | 8/2003 | Maimon et al. | 707/100 |
| 2004/0098594 A1 | 5/2004 | Fleming | |
| 2005/0182661 A1 | 8/2005 | Allard | |
| 2006/0090208 A1 * | 4/2006 | Smith | 726/26 |
| 2007/0177571 A1 * | 8/2007 | Caulfield et al. | 370/350 |

* cited by examiner

*Primary Examiner* — Christopher J Brown
*Assistant Examiner* — Fahimeh Mohammadi

(57) ABSTRACT

A user interface and a processor coupled to the user interface wherein the processor receives access requests through the user interface and authorizes access through the user interface. The processor associates a rights request with a role based policy to determine access rights, modifies the determined access rights in accordance with an exception list related to particular users and records, and authorizes access to a record based upon the modified determined access rights.

20 Claims, 3 Drawing Sheets

ROLE-BASED ACCESS CONTROL

CROSS REFERENCE TO RELATED CASES

Applicants claim the benefit of Provisional Application Ser. No. 60/718,180, filed Sep. 16, 2005.

The present system, Personalized Role-Based Access Control Model (PRBAC), relates to an improved role-based access control model.

Data security and privacy issues are traditionally important in the medical domain. However, recent developments such as digitization of medical records, the creation of central health record databases, and extramural applications in the personal health care domain (for example, access by insurance companies), pose new challenges towards the protection of medical data. In contrast to other domains, such as financial, which can absorb the cost of the abuse of the system, healthcare cannot. Once sensitive information about an individual's health problems is uncovered and the social damage is done, there is no way to revoke the information or to compensate the individual.

In addition, the medical information data has some specific characteristics, such as that medical data should only be accessible by authorized persons that are assigned a certain role within the medical field such as a general practitioner, an emergency doctor, a nurse, etc. This is different than a typical system for securing data wherein, access is typically provided on a person-to-person basis.

To support such requirements, the access control system allocates to each user a given role, while permission to access the data is assigned to the given roles, as opposed to individuals. In such a way, doctors and other people requiring access to a patient's electronic health record (EHR), are provided different privileges and different access depending on their specialties (roles) or a particular function that the person is serving at a given time. This approach, called Role-Based Access Control (RBAC), is very important in the healthcare domain, because in addition to practices where it is used for convenience, it is also enforced in the healthcare domain by legislation (e.g., the HIPAA (HEALTH INSURANCE PORTABILITY AND ACCOUNTABILITY ACT OF 1996) in the U.S.; see HIPAA, on the Internet at hipaa.org).

U.S. Patent Publication No. 2004/0098594 dated May 20, 2004, to Fleming et al., entitled "System and Method for Creating Role-Based Access Profiles," discloses a method of creating such profiles from information about existing access groups for computer resources within an organization. In operation, the party protecting the data accesses a list of associates and makes selections of the associates from the list to model access rights. This publication is incorporated by reference in its entirety. However, no patient input is considered in the method so the access rights may not be tailored to patient's individual desires.

U.S. Patent Publication No. 2002/0178119 dated Nov. 28, 2002, to Griffin et al., entitled "Method and System for a Role-Based Access Control Model with Active Roles," discloses an RBAC method and system for managing access to resources by including dynamic updating using role filters and capability filters. Each role filer is evaluated to determine which users are to be in that role. Each role filter further includes access capabilities, access conditions rights and qualifications for those rights. This publication is incorporated by reference in its entirety. Again, no patient input is considered in the method so the access rights may not be tailored to patient's individual desires.

U.S. Pat. No. 6,023,765 issued Feb. 8, 2000, to Kuhn and entitled, "Implementation of Role-Based Access Control in Multi-Level Secure Systems," discloses a method of establishing relationships between privileges with the RBAC system and pairs of levels and compartments within the multi-level security system. This patent is directed at controlling access to classified documents having three levels of classification as used in the U.S. Government based job status, etc. The user subject makes a request for access through a trusted intermediary that confirms the subject is allowed to access the classified documents based upon the user being a member of a role allowed access. This publication is incorporated by reference in its entirety. Similar to the problems in the above references, no subject is provided an ability to tailor access rights with this system.

U.S. Pat. No. 6,947,989 issued Sep. 20, 2005, to Gullotta et al., entitled "System and Method for Provisioning Resources to Users Based on Policies, Roles, Organization Information, and Attributes," discloses a means for provisioning users with resources. This method uses attributes, organizational information, user roles, and resource provisioning policies based on attributes and user roles. By this method a user is provided with certain resources including hard resources such as computers and telephones, and soft resources such as access to databases, files, folders, and the like. There is no provision to allow the user to control this process such as restricting access to databases to other users or persons not in a defined organizational role.

Thus, there exists a need for a personalized role-based access control system that takes into account access control that may be dictated and tailored by the patient.

Recent trends in the healthcare sector towards personal, user-focused healthcare also demand more user (e.g., patient) involvement at all levels of healthcare. In recent times, patients are taking more active roles in their own healthcare management by obtaining disease information, discussing issues with doctors, tracking symptoms and managing their illnesses. Consequently, patients are also more involved in keeping and managing important medical documents that they have access to as well as having a desire to restrict access of others.

The ability to access electronic health care records has created attention by law makers who have enacted the HIPPA Act according to which patients have the right to request restrictions with respect to access to the patient's personal health records. For example, a patient may request additional restrictions on the disclosure of their records to certain individuals involved in their care that would otherwise be permitted access (with respect to role-based access control governed by the care institution). The care provider is not required to agree to that request. However, if the care provider agrees, it is required to comply with the agreement, (except in certain cases, e.g., if the information is needed to treat the patient in the case of an emergency).

This poses additional requirements on confidentiality and access control with respect to health records. Namely, in some cases access is based on roles; in other cases, it is not only based on roles but also on individual restrictions. Furthermore, a patient should be able to extend access to his personal record and allow access to certain family members or friends. Therefore, there is a clear need for a combination of role-based access control and patient-managed access control.

Nowadays, solutions for protection of proprietary information are mostly based on static RBAC models. The healthcare industry in light of the current legislation requires more including flexibility and authorization enforcement.

It is an object of the present system to overcome these and other disadvantages in the prior art.

The present system provides an improved role-based access control system and method that may be directed at the healthcare industry and that can efficiently handle exceptions to fulfill security requirements of healthcare applications and legislation that is directed at the security of electronic medical records.

The present system may include a Policy Repository and an Exception List.

Initially, the Policy Repository contains default policies that are defined by the system based on roles. A patient may thereafter make exceptions by restricting rights or adding rights from which Personalized Policies are defined and added to the Policy Repository. The system normally has a set of Default Policies, but if they are changed by Personal Policies, these personal policies override the Default Policies, which are replaced as appropriate in the repository.

The Personalized Policies in this situation may be dynamic in that an old Personalized Policy may be overridden by a new Personalized Policy. The Exception List operates as a current personalized policy that may be defined as a listing of all the users in conflict with the default policy, or with the Personalized Policy overriding the default policy (respectively the current personalized policy). In one embodiment, the Exception List may serve as a merger of a black list and a white list that may be used to reduce a requirement for computer assets and time in obtaining access as well as helping to ensure proper access to medical data, for example.

These and many other objects, features and advantages of the present system will be readily apparent to one skilled in the pertinent art from the following detailed description of a preferred embodiment of the system and the related drawings.

It should be expressly understood that the drawings are included for illustrative purposes and do not represent the scope of the present system. The present system is explained in further detail, and by way of example, with reference to the accompanying drawings wherein.

Figure 1:
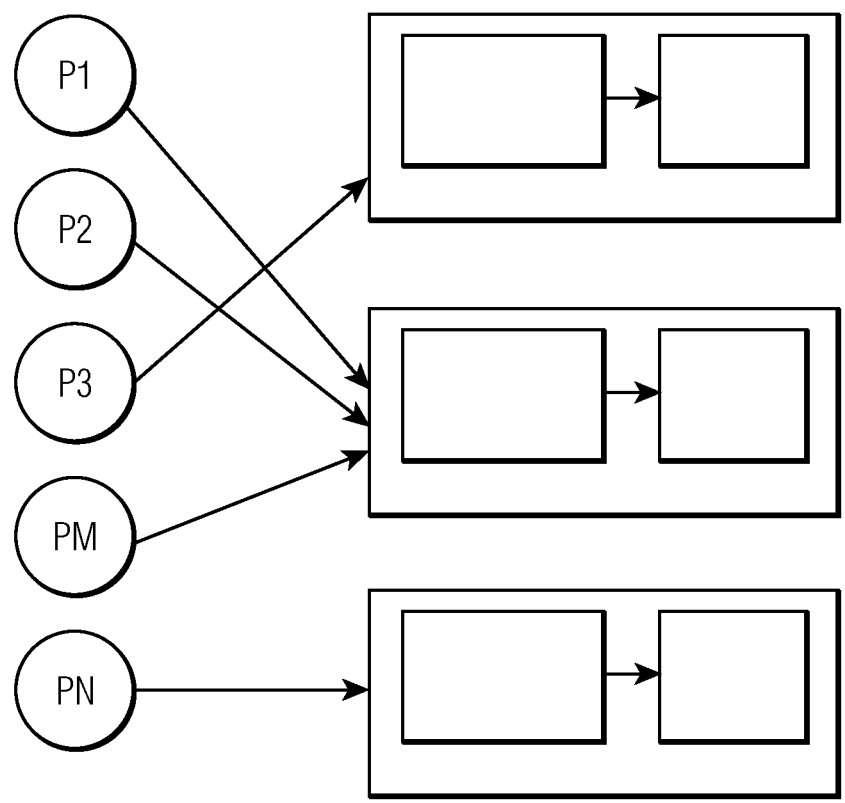
FIG. 1 illustrates a model where the patients have similar personalized policies and exception lists in accordance with an embodiment of the present system.

The present system will illustratively be described herein with regard to medical records within the healthcare field. As would be readily apparent to a person of ordinary skill in the art, the present system may be suitably applied to restricting access to any type of records within any type of electronic record keeping system.

Within the confines of the present system, there are generally two types of users. A first type of user is the user that has the right to define the access control rules for the records including add or modify/influence access rules defined by default policies of healthcare providers (e.g. hospitals). In the healthcare field, this is the patient user to which the records apply. The patient user may define or modify access rights to that patient user's healthcare records and accordingly may allow or restrict access as desired. The second type of user is the user that accesses the records in accordance with the rights defined by the patient user. Illustratively, the terms patient user and healthcare user, and the like, will be utilized herein to facilitate differentiation when the different users are discussed.

In accordance with an embodiment of the present system, a Policy Repository and an Exception List may be utilized to control a healthcare user's access to records. Initially, the Policy Repository may contain Default Policies (DPs) that are defined by the system based on roles. The DPs thereby define a relationship between particular classifications of records and the roles of potential healthcare users who may desire access to the records. The Default Policies are generally defined by combining atomic blocks of data to create the access policies. The atomic block is defined as the smallest XACML (eXtensible Access Control Markup Language) element that appears to execute completely or not at all. An atomic block occurs as a logical unit. For example, a Default Policy (DP) may relate to General Practitioner's (GP) access to Employee Health Records (EHR's) of patient's. An illustrative DP may be:

DP: GPs have access to all EHR's of any patient

As a further example, Surgical Practitioner's (SP's) may have more restricted rights than GPs. An illustrative DP for SPs may be:

DP: SPs have access to all surgical EHR's of any patient

In this way, merely by the default role-based access control (RBAC), different medical professionals are potentially provided access to classifications of EHR's that are relevant for particular medical specializations.

In accordance with the present system, a patient may thereafter make exceptions by restricting rights or adding rights to create a Personalized Policy that is added to the Policy Repository and applies, at least for the patient that created the Personalized Policy, in place of the Default Policy. In this way, the present system has a set of Default Policies, which may be changed by Personal Policies. These Personal Policies override the Default Policies, and are placed as appropriate in the Policy Repository to control access to a patient's records, at least for the patient that created a given Personal Policy.

The Personal Policies generally are similar to Default Policies and define roles of healthcare users or classifications of content that may be removed or added by removing or adding atomic blocks from or to a Default Policy to create the Personalized Policy. A user may create a Personalized Policy by starting with a Default Policy and simply removing or adding restrictions at the atomic block level or records level. For example, a Default Policy (DP) that is replaced by a Personal Policy (PP) in the Policy Repository may be:

DP: GPs have access to the EHR of a patient

PP of user A: GPs have access to the EHR of a patient, except to gynecological EHR This system provides for a simplified method of controlling access to records based on RBAC, as modified by Personalized Policies. Further, the Personalized Policies in this situation may be dynamic in that a patient may decide to override an old Personalized Policy by a new Personalized Policy. In a case wherein a Personalized Policy is created for a particular patient, the new Personalized Policy may simply replace the old Personalized Policy in the Policy Repository. In a case wherein the Personalized Policy is applied to a group of patients, then a new Personalized Policy to be applied for a particular patient may simply be added to the Policy Repository and be applied for the patient that created the new Personalized Policy.

In a case wherein Personal Policies are created, these policies are dominant, overriding the default ones at least for the patient that created the Personalized Policy or the group of patients to which the Personalized Policy applies. In effect, the Personalized Policy becomes the Default Policy for at least the patient that created the Personalized Policy or the group of patients to which the Personalized Policy applies.

In accordance with a further embodiment, an Exception List (EL) for healthcare users may be defined as a listing of all the healthcare users or roles that are in conflict with the Default Policy or current Personalized Policy if one is defined. A conflict may exist when the Exception List affords less or more rights. A "+" may be used to designate that the healthcare users have extra rights, and a "−" may be used to designate that the healthcare users have restricted rights. The Exception List confers or invalidates some right to the healthcare users present in the Exception List.

In accordance with an embodiment of the present system, two algorithms may be used to operate the system as described above. A first algorithm, CreatePersonalizedPolicy, may be utilized when a patient creates an Exception List. In a further embodiment, the CreatePersonalizedPolicy algorithm may also determine whether it is desirable to replace the Default Policy by a Personalized Policy. In this embodiment, in a case wherein the same restrictions or additional rights present in the Exception List concern more than half of the healthcare users, the Default Policy or the current Personalized Policy may be overridden, respectively by a Personalized Policy or a new Personalized Policy. In operation, once an Exception List is constructed by the user, the CreatePersonalizedPolicy algorithm may count if the number of healthcare users under a same exception is a majority. In a case wherein the number of healthcare users under the same exception is a majority, this means that the exception is almost a generality and the algorithm may define or modify a Personalized Policy by respectively combining the Default Policy or the old Personalized Policy with the same exception.

In operation, when a healthcare user requests a patient record, a second algorithm, RequestRights, may first check the Default Policy. The RequestRights algorithm then may check if a Personalized Policy or at least an applicable Personalized Policy exists for that record and healthcare user. Lastly, the RequestRights algorithm may look for the presence of the healthcare user in the Exception List. The RequestRights algorithm returns the rights of the healthcare user.

As an illustrative example of an embodiment of the present system for five particular general practitioners (GPs), identified by the names Anna, Bart, Charles, Daniel and Emma. Frank is a patient of the hospital where these GPs work. In this example, Frank is ashamed of a portion of his medical record and decides to deny access to a part of his electronic health record, concerning a sexual disease, for a GP Frank knows personally, namely Charles. Since all access rights (policies) are defined as atomic blocks, Frank may restrict access to the atomic blocks related to Franks sexual disease. Illustratively, the atomic blocks concerning Franks sexual disease are blocks 17 and 18. The access for Frank may look like:
DP: GPs have access to the EHR of a patient
PP: NULL (Frank has no PP)
EL: GP(Charles, −17/−18)

Expanding on this example, Frank after some consideration decides to restrict access to this data not only to Charles, but also to all the GPs, except the one that treated him, namely Bart. If there were no personalized policy, the exception list would look like this:
DP: GPs have access to the EHR of a patient
PP: NULL
EL: GP(Charles, −17/−18)
   GP(Anna, −17/−18)
   GP(Daniel, −17/−18)
   GP(Emma, −17/−18)

However, in accordance with an embodiment of the present system, the above access control expression may be simplified to:
DP: GPs have access to the EHR of a patient
PP: GPs have access to the EHR of a patient, except to blocks 17 and 18
EL: GP(Bart, +17/+18)

In this embodiment, since the Personalized Policy may override the Default Policy, now by default (in effect), no GP but Bart has access to blocks 17 and 18. In this way, the Exception List may be greatly simplified to only have one element instead of four.

In a yet another embodiment, a personalized policy may consist as mentioned before from a number of atomic policy blocks related to different data blocks or group of data blocks, such as 17 and 18 in the previous example. Instead of having one exception list that covers all atomic policy blocks, each of these blocks may also be associated with a separate exception list that relates to this block.

The Personalized Policy may be interrogated whenever it is necessary to know the rights of a healthcare user identified with a specific role that is requesting data of a patient.

In accordance with an embodiment of the present system, the role policies may be modified to maintain the Exception List as light (small) as possible. In an example in accordance with this embodiment, suppose that exactly half of the users have the same exception when an administrator (or a patient) decides to apply the same exception to a new healthcare user. With this added exception, the majority is now affected by this exception (restriction). In accordance with this embodiment, to avoid having a majority of users in the Exception List, a new Personalized Policy may be created that is the same as the Default Policy, plus the common exception/restriction. The Exception List, once updated, will now contain a minority of healthcare users that have access restrictions or additional rights while they are engaged in a specific role. Each line in the Exception List may concern one healthcare user and may contain the role, the identification of the healthcare user, or other means of identifying a relevant healthcare user, and the restrictions or extra rights the healthcare user has concerning one of the patients and one or more atomic blocks. When a new Personalized Policy is created, all rights and restrictions of the healthcare users having the affected role are updated.

While the embodiments discussed this far related to one patient and the policies restricting access to that patient's records, a further embodiment may include grouping the patients to have the same policies (either Default Policies or Personalized Policies). In this way, the patients' access policies may be joined as a function of their Personalized Policy and Exception List.

FIG. 1 is an illustrative example in accordance with this embodiment where assorted patients have the same Personalized Policies (that in some cases may be NULL), as well as the same Exception Lists. Of course, each of the patients shares the same Default Policies although this is not shown. In FIG. 1, patients P1, P2, PM share the same Personalized Policy λ and Exception List λ, while patient P3 has a Personalized Policy θ and an Exception List θ, and patient PN has a Personalized Policy ξ and an Exception List ξ.

Figure 2:
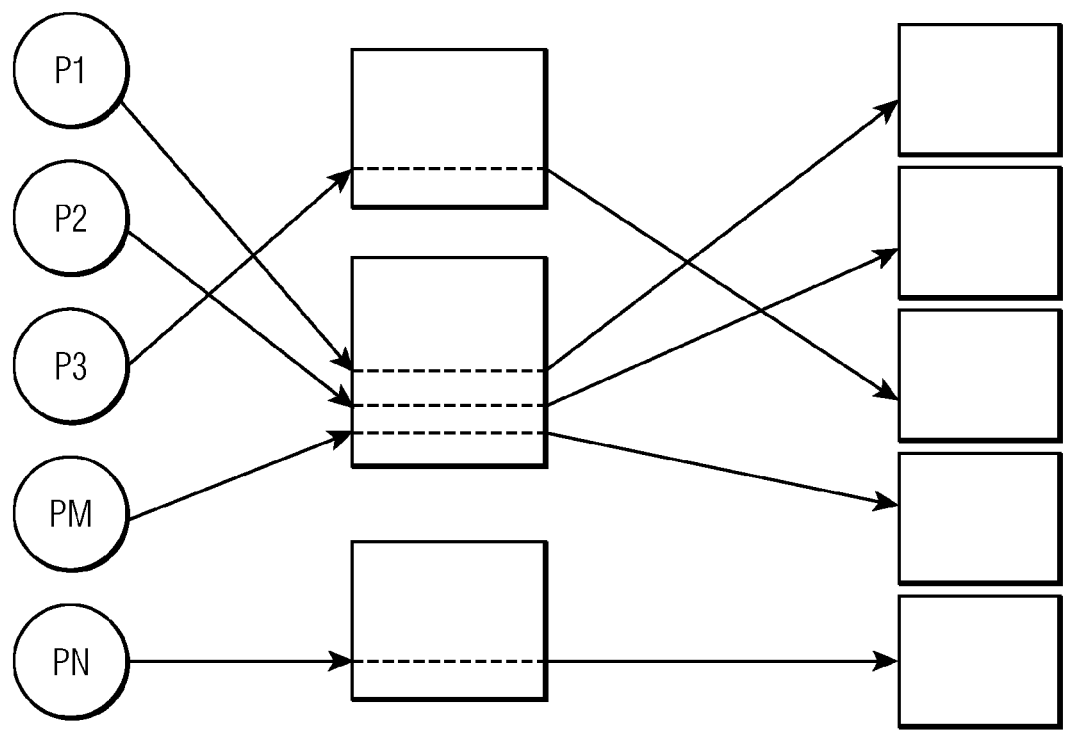
FIG. 2 illustrates a model where the patients have similar personalized policies but different exception lists in accordance with an embodiment of the present system.

FIG. 2 is an illustrative example in accordance with a further embodiment where patients have the same Personalized Policy, but different Exception Lists. In FIG. 2, patients P1, P2, PM share the same Personalized Policy λ yet each has a patient specific Exception List. Patients P3 PN each have separate Personalized Policies, respectively θ and ξ and separate Exception Lists.

Figure 3:
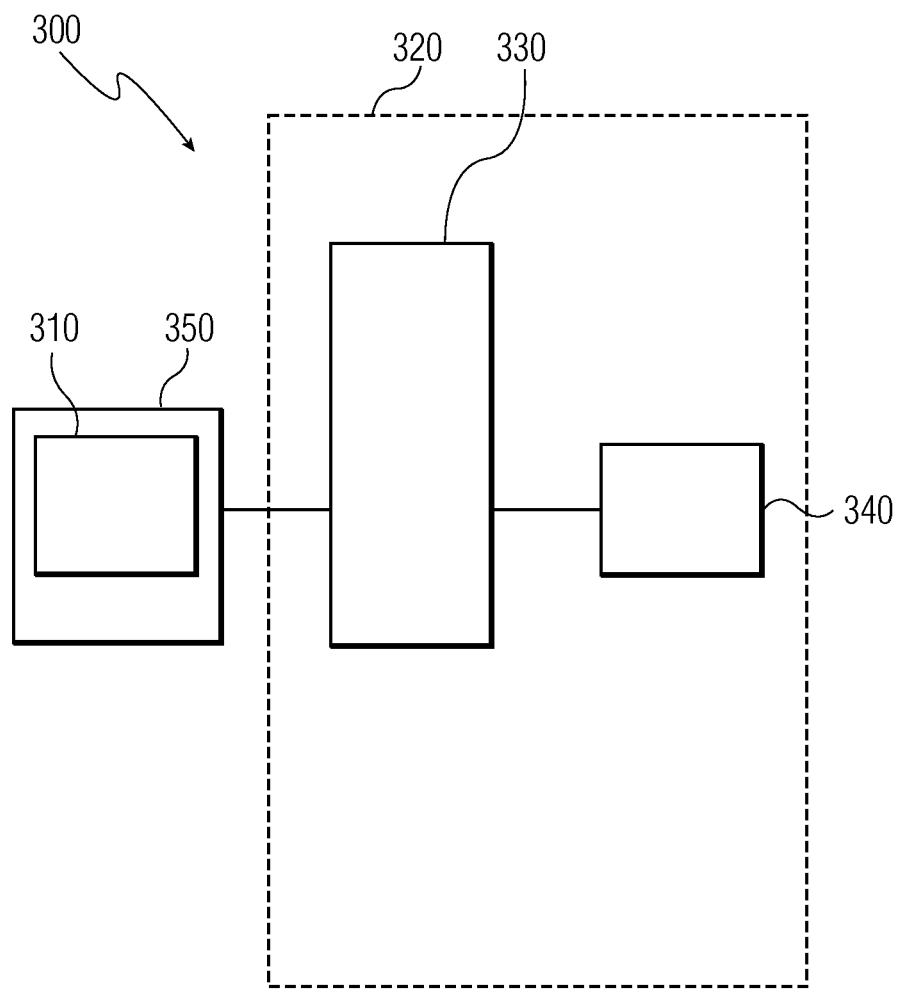
FIG. 3 is a block diagram of the personalized role-based access control system in accordance with an embodiment of the present system.

FIG. 3 shows a system 300 that may operate in accordance with one or more of the embodiments of the present system illustratively described above. The system includes the display device 350 hosting a user interface 310 that facilitates patient's creation of policies and exceptions lists. The user interface 310 also facilitates healthcare user's requests for access to records in accordance with the policies and exceptions. The display device 350 is operably coupled to a processor 330 that is configured to facilitate production of the user interface 310, alone or together with capabilities of the display device 350. The processor 330 is also operable to receive instructions regarding policies, exceptions, and access requests. A memory 340 is operably coupled to the processor 330 and is capable of storing necessary instruction and data, such as operating instructions to be executed by the processor for operation as described. The memory 340 is also operable to store policies, exceptions and records that may be accessed by patients and healthcare users through the user interface 310 and the processor 330. The processor 330 and memory 340 together function as a server based record access system 320. It should be noted that the interconnection among display device 350, processor 330, and memory 340 may be via any communication link, such as wired or wireless communication directly or through a network. Short range wireless communication such as using Bluetooth™ communication protocol may also be suited, for example, between the processor 330 and the display device 350, as well as between memory 340 and processor 330 as would be wired communication, such as through an Internet or Intranet link.

Transceivers for transmitting and receiving signals through wires or a wireless interface, may also be provided as needed, including antennas in the case of wireless communication. Modulators, demodulators and filters may also be used to extract information or control signals from carrier signals for further processing.

The processor 330 may be any type of controller or processor for processing electronic signals, including microprocessor, microcontroller, reduced instruction set controller, and other devices that are capable of providing control signal in response to input signals from the user interface 3 10, executing instructions stored in the memory 340, which may be any type of memory, RAM, ROM, removable memory, optical medium, electromagnetic medium, etc. It should be understood that the display device 350, the processor 330, and the memory 340, although shown as part of the system 300, may be separate units alone or in combination with other units. For example, the processor 330 and memory 340 may be part of a personal computer, and the user display device 350 a separate or integrated unit therewith. The display device itself may be implemented in a personal computer or any device capable of hosting the user interface 310, accepting user input, and providing control signals to the processor 330, such as personal digital assistants (PDAs), cell phones, and the like.

Having described embodiments of the present system with reference to the accompanying drawings, it is to be understood that the present system is not limited to the precise embodiments, and that various changes and modifications may be effected therein by one having ordinary skill in the art without departing from the scope or spirit as defined in the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

The invention claimed is:

1. A method of using a role-based access control (RBAC) system for controlling access rights to protected resources in a medical record keeping system, the method comprising the acts of:

assigning role based policies to individual users of the record keeping system based on roles of the users, wherein a role based policy includes a set of predetermined access rights for a corresponding role to a medical record of a patient in the record keeping system, wherein the medical record keeping system stores medical records of multiple patients;

modifying the set of predetermined access rights to change access of an individual user to the medical record of the patient in accordance with an exception list related to the individual user and the medical record of the patient without changing the role of the individual user or modifying the role based policy assigned to the individual user;

authorizing access to the medical record based upon the modified set of predetermined access rights, wherein at least one of the acts is performed by a microprocessor;

determining if an exception applies to a majority of the users or a majority of the medical records; and modifying the role based policy to include the exception if the exception applies to the majority of at least one of users or the medical records.

2. The method of claim 1, wherein the role based policy is a default policy modified to be a personalized policy through instruction from the patient.

3. The method of claim 1, further comprising:

modifying the exception list to apply to a minority of users rights previously controlled by the role based policy.

4. The method of claim 1, comprising the act of associating the role based policy to the exception list.

5. The method of claim 1, wherein the exception list is one of a plurality of exception lists, the method comprising the act of associating each of the plurality of role based policies to one or more of the plurality of exception lists.

6. The method of claim 1, wherein the role based policy is one of a plurality of role based policies and the exception list is one of a plurality of exception lists, the method comprising the act of associating each one of the plurality of role based policies to one of the plurality of exception lists.

7. The method of claim 1, comprising the act of associating additional access rights and restricted access rights with the exception list.

8. The method of claim 1, wherein modifying the set of predetermined access rights include removing present access rights of the user to at least a sub-portion of the record.

9. The method of claim 1, wherein the record includes information about a human subject and the exception list denies access to certain information in the record to the user, and wherein the user was previously given access to the certain information through the assignment of the user with the role based policy.

10. The method of claim 1, wherein the user is a doctor, the record corresponds to a patient, the determined access rights from the role-based policy correspond to default access rights of a doctor to the record and the exception list modifies the determined access rights, and wherein the role-based policy continues to provide the default access rights to doctors assigned the role-based policy after the modified determined access rights.

11. A role-based access control (RBAC) system for controlling access to protected resources, the system comprising:
a user interface;
and a processor operably coupled to the user interface, wherein the processor is configured to receive access requests through the user interface and is configured to authorize access through the user interface, wherein the processor is configured to associate a rights request of an individual user with a role based policy to determine access rights to a medical record of a patient, modify the determined access rights to change access of the individual user to the medical record of the patient without modifying the role based policy in accordance with an exception list related to particular users and medical records, and authorize access to the medical record based upon the modified determined access rights,
wherein the processor is configured to determine if an exception applies to a majority of users, is configured to modify the role based policy to include the exception if the exception applies to the majority of users, and is configured to modify the exception list to apply to a minority. of users rights previously controlled by the role based policy.

12. The system of claim 11, wherein the role based policy is one of a plurality of role based policies and the exception list is one of a plurality of exception lists, the processor configured to associate each one of the plurality of role based policies to one of the plurality. of exception lists.

13. The system of claim 11, wherein the processor is configured to associate additional access rights and restricted access rights with the exception list.

14. The system of claim 11, wherein the processor is configured to update instructions for determining the role based policy by combining the role based policy with the exception list and wherein the access requests are requests to access the medical records.

15. An application embodied on a non-transitory computer readable medium configured to provide a role-based access control system (RBAC), the application comprising:
a portion configured to associate a rights request of an individual user with a role based policy to determine access rights for a corresponding role to a medical record of a patient in the RBAC system, wherein the RBAC system stores medical records of multiple patients;
a portion configured to modify the determined access rights to change access of the individual user to the medical record of the patient in accordance with an exception list related to the individual user and a medical record of the patient without modifying the role based policy assigned to the individual user;
a portion configured to authorize access to the medical record based upon the modified determined access rights;
a portion configured to determine if an exception applies to a majority of atomic blocks that have the same policy;
a portion configured to modify the role based policy to include the exception if the exception applies to the majority of atomic blocks; and
a portion configured to modify the exception list to apply to a minority of atomic blocks previously controlled by the role based policy.

16. The application of claim 15, wherein the role based policy is a default policy modified to be a personalized policy.

17. The application of claim 15, comprising a portion configured to associate the role based policy to the exception list.

18. The application of claim 15, wherein the exception list is one of a plurality of exception lists, the application comprising a portion configured to associate each of the plurality of role based policies to one or more of the plurality of exception lists.

19. The application of claim 15, wherein the role based policy is one of a plurality of role based policies and the exception list is one of a plurality of exception lists, the application comprising a portion configured to associate each one of the plurality of role based policies to one of the plurality of exception lists.

20. The application of claim 15, comprising a portion configured to associate additional access rights and restricted access rights with the exception list.

* * * * *